Figure 1:
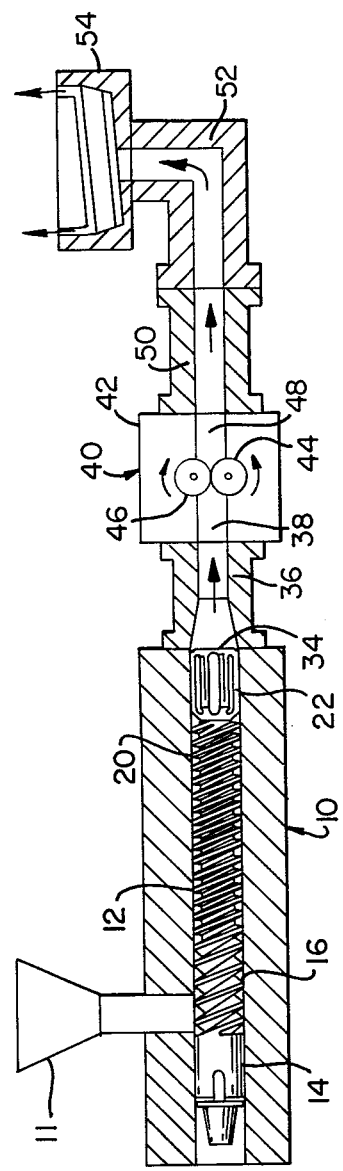

United States Patent [19]

Jones et al.

[11] Patent Number: 4,461,734
[45] Date of Patent: Jul. 24, 1984

[54] PROCESS FOR PLASTICIZATION AND PUMPING OF LOW BULK DENSITY PLASTICS

[75] Inventors: David N. Jones, Long Valley; Urho S. Haapala, Middlesex; Leonard S. Scarola, Union, all of N.J.

[73] Assignee: Union Carbide Corporation, Danbury, Conn.

[21] Appl. No.: 417,579

[22] Filed: Sep. 13, 1982

[51] Int. Cl.³ .............................. B29B 1/04; B29B 1/06
[52] U.S. Cl. ................................. 264/176 R; 264/349; 264/DIG. 69; 425/207; 425/376 B
[58] Field of Search ............... 264/176 R, 176 F, 349, 264/37, DIG. 69, 40.7, 40.1–40.4; 425/376 R, 376 A, 376 B, 145, 207

[56] References Cited

U.S. PATENT DOCUMENTS

| | | | |
|---|---|---|---|
| 2,819,493 | 1/1958 | Hawtin et al. | 425/376 A |
| 3,078,513 | 2/1963 | Levison et al. | 425/376 A |
| 3,148,231 | 9/1964 | Spencer | 425/145 |
| 3,280,425 | 10/1966 | Beck et al. | 366/81 |
| 3,309,736 | 3/1967 | Rodenacker | 366/88 |
| 3,730,492 | 6/1971 | Maddock | 259/193 |
| 3,991,153 | 11/1976 | Klausner et al. | 264/349 |
| 4,013,745 | 3/1977 | Brinkmann et al. | 264/37 |
| 4,015,828 | 4/1977 | Miles | 264/349 |
| 4,025,056 | 5/1977 | Miles et al. | 366/262 |
| 4,032,391 | 9/1977 | Moked et al. | 159/47 |
| 4,137,023 | 1/1979 | Moked et al. | 418/15 |
| 4,321,229 | 10/1980 | Blakeslee et al. | 264/349 |
| 4,343,755 | 8/1982 | Miller et al. | 264/176 R |
| 4,350,657 | 9/1982 | Jones et al. | 264/176 R |

FOREIGN PATENT DOCUMENTS

| | | | |
|---|---|---|---|
| 1435353 | 3/1969 | Fed. Rep. of Germany | 425/376 R |
| 2051568 | 4/1972 | Fed. Rep. of Germany | 264/37 |
| 2703461 | 8/1978 | Fed. Rep. of Germany | 264/176 R |
| 55-14253 | 1/1980 | Japan | 264/37 |
| 2076728A | 12/1981 | United Kingdom | 264/37 |

OTHER PUBLICATIONS

A Further Commentary on a Melt Pump of this Type is set forth on page 2 of the ASME Paper by W. T. Rice, entitled "Conservation of Energy and Raw Materials by Utilization of Gear Pumps in Conjunction with Extruder Processes", delivered Feb. 3–7, 1980 at the Energy Technology Conference Exhibition, New Orleans, LA.

*Primary Examiner*—Jeffery R. Thurlow
*Attorney, Agent, or Firm*—Gerald R. O'Brien, Jr.

[57] ABSTRACT

Process for the plasticization and pumping of low bulk density synthetic thermoplastic materials through extrusion die means employing a mixer type extruder, the extrudate from said extruder is passed through a rotary melt pump and the molten material is discharged therefrom through a die member.

6 Claims, 2 Drawing Figures

PROCESS FOR PLASTICIZATION AND PUMPING OF LOW BULK DENSITY PLASTICS

The present invention relates to a process for the plasticization and pumping of low bulk density synthetic thermoplastic materials through extrusion die means.

Normal or conventional bulk density synthetic thermoplastic materials are commonly plasticized and pumped as a molten stream through extrusion dies without considerable difficulty. The continuous single or double screw extruders employed have rotary screws designed to flux and melt the selected thermoplastic polymer being processed and to pump the molten polymer to and through a downstream extrusion die at a desired rate.

Conventional extruder screws have feeding, transition and metering sections successively along their length and typical geometries as set forth hereinbelow. The feeding and transition sections are required to provide an over-supply of input molten polymer to the metering section which controls and limits the throughput rate of the over-all extruder.

However, should it be desired to process low bulk density synthetic thermoplastic materials or blends of such low bulk density materials with conventional bulk density materials, problems are immediately encountered.

As employed herein, the term "conventional bulk density thermoplastic materials" is intended to denote thermoplastic materials having a bulk density in the normal bulk density range encountered with virgin or neat materials of that polymer composition. For example, for virgin or regular polyethylene resin materials, the normal bulk density is in a range from about 25 to 36 lbs/ft$^3$. The term "low bulk density thermoplastic materials" denote those materials having densities below and up to about 24 lbs/ft$^3$ and include both scrap and blends of scrap and virgin normal, conventional or regular materials. Blends of such virgin or regular materials and scrap materials yield materials having bulk densities in a range up to about 24 lbs/ft$^3$. Scrap densities range from as low as about 2 to 9 lbs/ft$^3$. Some of such scrap material is a different kind of low bulk density product being composed of film shredded into a fluffy material and providing a product much lower in bulk density that of other low bulk density polyethylene materials.

The situation is quite analogous with other thermoplastic polymer systems, such as for example polystyrene, polypropylene, and the like.

During extrusion of granular and low bulk density materials, solids conveying in the screw feeding section is often inadequate to properly fill the screw and hence results in undersupplying the screw transition and metering sections. This results in polymer surging, high melt temperatures, and excessive polymer degradation—all of which reduce product quality.

The prior art has attempted in a number of ways to mechanically force the low bulk density polymer through the feeding section in order to keep the metering section continuously over-supplied during operation, but successful results were not obtained.

It has been found that successful results can be obtained by relieving the metering section of the requirement of solely providing the control of the material throughput rate. The prime responsibility for this requirement is passed on to a downstream melt pump of the type having compression zones (of decreasing hydraulic radii in downstream direction) between the gears and housing of the pump, as disclosed and claimed in U.S. Pat. No. 4,137,023 of I. Moked et al issued Jan. 30, 1979 and entitled "Low Energy Recovery Compounding and Fabricating Apparatus for Plastic Materials." A further commentary on a melt pump of this type is set forth on page 2 of the ASME paper by W. T. Rice, entitled "Conservation of Energy and Raw Materials by Utilization of Gear Pumps in Conjunction with Extruder Processes" delivered Feb. 3–7, 1980 at the Energy Technology Conference Exhibition, New Orleans, La.

Both of these references recognize that low energy processing may be obtained employing downstream melt pumps of this type in conjunction with an extruder in the handling of virgin or high bulk density plastics, however, it has never been disclosed or suggested to employ modified extruder-melt pump equipment in the processing of low bulk density materials.

It has been found that the extruder preferably employed in this processing of low bulk density materials may be modified so as to change the normal extruder section handling functions to produce the over-supplying feed of material to the metering section. This may be accomplished by providing in the feeding section a relatively deeper screw root depth and/or greater screw pitch and/or greater screw length than normally employed in feeding sections of extruders handling virgin or high bulk density polymer materials. In this manner the volumetric throughput rate (in terms of volume of material per unit of time) of the feeding section is increased to compensate for the lower bulk density of material being processed, thereby providing a substantially thermoplastic material filled metering section in the extruder or mixer. Although this assists in improving the throughput rate of the material flow throughout the process, the provision of a downstream rotary melt pump, is required to fully control the material throughput rate of the over-all process.

In accordance with the present invention, a process is provided for the plasticization and pumping of low bulk density synthetic thermoplastic materials through extrusion die means employing a rotary mixer type extruder, wherein the extrudate from said extruder is successively passed through an upstream flow channel or adapter member to the inlet of a rotary melt pump which serves to control the material throughput rate of the process by the rotational speed of the gears and the molten material is discharged therefrom, through a down stream flow channel or adapter member, to and through a die member.

It has been found preferable to employ an extruder of the rotary mixer type having successive feeding, transition and metering sections and a melt pump; said feeding section having relatively deeper screw root depth and/or greater screw pitch and/or greater screw length than normally employed, thereby increasing the volumetric throughput rate through the feeding section to compensate for said lower bulk density of material being processed and provide a substantially material-filled metering section not alone capable of controlling the material throughput rate of the process.

It has been found most preferable that the feeding section may be modified in at least one of the following ways to improve its throughput rate in the handling of low bulk density synthetic thermoplastic materials:

(a) Increasing up to 40% the screw root depth of the screws of the feeding section; and/or (b) Increasing up to 40% the screw pitch of the screws of the feeding section; and/or (c) Increasing up to 75% the length of the screw of the feeding section.

Figure 2:
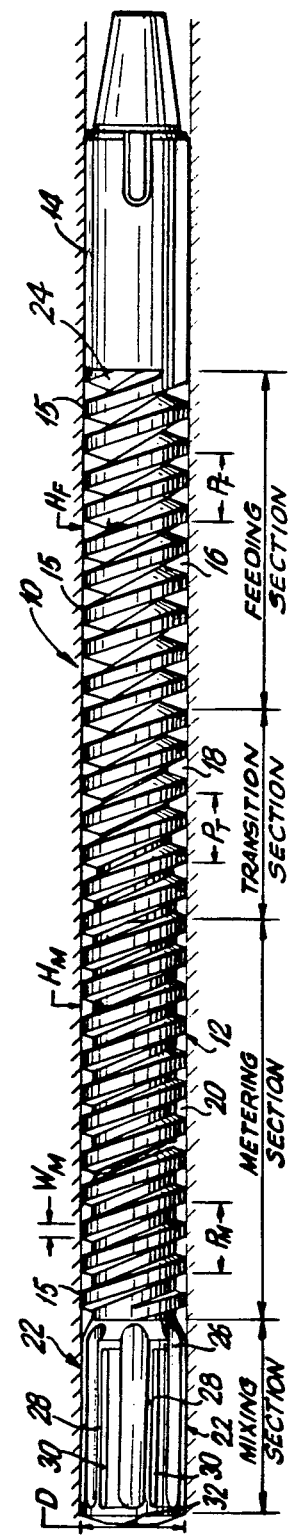

In the drawings:

FIG. 1 is a schematic view in vertical elevation showing components of apparatus suitable for carrying out the process for the present invention; and FIG. 2 is a schematic view in side elevation showing multi-section extruder screw apparatus capable of use in the extruder of the type shown in FIG. 1 for practicing the process of the present invention with low bulk density thermoplastic material.

Referring specifically to FIGS. 1 and 2 of the drawings, apparatus embodying the invention and most preferred for practicing the method aspects of the invention is provided having an extruder housing 10 with a material inlet hopper 11 and a multi-section extruder screw 12 positioned therein having a drive portion 14 at the rearward end thereof; screw flights 15 a feeding section 16 immediately downstream thereof; a transition section of varying screw root depth next downstream thereof; a metering section 20 next downstream thereof and a terminal fluted mixing secion 22 at the downstream end thereof.

The thermoplastic material (not shown) to be extruded is fed in particulate form (such as pellets, granules, particles, powders, shredded films and the like) through the extruder housing 10 near the upstream end 24 of the feeding section 16. The thermoplastic material is thus passed through the feeding section having a uniform root depth $H_F$ and is initially compacted and compressed in the feeding section which serves to develop heat within the material and effect the beginnings of melting of the solid material by the time it is passed into the transition section 18.

In the transition section, the screw root depth successively decreases from a value of $H_F$ to a value of $H_M$, the screw root depth of the metering section. The material passing through the transition section continues to melt, initially interfaces between already molten polymer and solid compacted particulate material, to a point where solid particles break up and small particles of solid polymer become dispersed in the main body of now primarily molten polymer material.

A subsequent mechanical working and pumping of the molten polymer is achieved in metering section 20 of the screw (as shown in FIG. 1) from where the primarily molten polymer is passed to an optional final mixing section 22. The mixing section, employed in one mode of apparatus, is of the type which is disclosed and claimed in U.S. Pat. No. 3,730,492 issued May 1, 1973 to B. H. Maddock and entitled "Mixing of Thermoplastic Materials". Such a mixing head or section is referred to as a "fluted mixing head of the outside-in type", indicating that the passage of material is from the outside flutes through radial passages to a central axial internal passage from which it is discharged through the downstream end of the mixing section 22.

Final mixing and complete homogenization of fully molten polymer material is carried out under high shear conditions in the mixing section. As the material is broken into a number of streams, each entering a successive inlet fluted passage 26, it is forced from such passages over the intervening, leading lands 28 to the slots 30 which communicate to a central axial internal passage in which the molten streams join and are passed axially from the mixing section through discharge passage 32 at the discharge end of the extruder screw. The discharged material is passed from the extruder 10 through breaker plate 34 to an upstream flow channel 36 and into the inlet passage 38 of melt (gear) pump 40.

Such a melt pump, as described and claimed in U.S. Pat. No. 4,137,023 for example, comprises an outer body or housing 42 having positioned therein a pair of rotary gears 44 and 46 which are parallel, intermeshing and counter-rotating and which pass the incoming material from inlet passage 38 of melt pump 40 through compression zones of changing hydraulic radii around the outer wall portions of the inner chamber (not shown) of the melt pump. The melt streams which pass around the melt pump gears rejoin to form a single stream in the discharge passage 48 through which it passes from the melt pump.

The molten material discharged from the melt pump passes through downstream flow channel 50 and, in turn, through the die adapter 52 from whence it passes to die member 54.

In selecting an extruder and melt pump combination for the low bulk density extrusion system of the invention, it is important to insure that the feeding or pumping requirements of the application of the system are met. In this case, the pressure and throughput rate requirements of the die assembly will determine the capacity of the melt pump required to perform the use or application requirements of the over-all extrusion-pumping system. Such selection of a suitable melt pump will leave to the extruder all melting and mixing requirements of the system. In this sense, it is important that the extruder output be dymanically matched to the output requirements of the melt pump so that it feeds to the melt pump inlet approximately the throughput demands of the melt pump. Extrusion of too small amounts of molten material will cause undesirable results from "starvation rate feeding" and extrusion of too large amounts will result in undesirable backflow of melt material in the upstream end of the extruder.

Accordingly, the extruder parameters and differential rotation speeds of the extruder and gear pump are so selected to achieve an extruder output rate matching the throughput rate of the melt pump. The accomplishment of this matching assures that the system combination of melt pump and extruder provides the required pumping system for low bulk density thermoplastic materials at conditions attainable in conventional systems of the prior art having typical geometries as outlined in the following Table I.

TABLE I

|  | Lead (inch) | Depth (inch) | Length (inch) |
|---|---|---|---|
| 2.5 inch extruder | | | |
| Feed | 3.0 | .450 | 12.5 |
| Transition | 2.5 | .160 | 12.5 |
| Metering | 3.5 | .160 | 15.0 |
| 3.5 inch extruder | | | |
| Feed | 4.2 | .500 | 17.5 |
| Transition | 3.5 | .190 | 17.5 |
| Metering | 3.5 | .190 | 21.0 |
| 4.5 inch extruder | | | |
| Feed | 5.4 | .660 | 22.5 |
| Transition | 4.5 | .250 | 22.5 |
| Metering | 4.5 | .250 | 27.0 |
| 6.0 inch extruder | | | |
| Feed | 7.2 | .800 | 30.0 |
| Transition | 6.0 | .325 | 30.0 |

TABLE I-continued

|  | Lead (inch) | Depth (inch) | Length (inch) |
|---|---|---|---|
| Metering | 6.0 | .225 | 36.0 |

Experiments have shown (Tables IIA and IIB) that the addition of 10% film regrind to a neat or virgin granular resin extruder supply can result in reduced bulk densities of up to 20% and associated feed rate reductions of up to 28%. Thus, in the case where virgin or neat resin feed rates produce acceptable extrusion, the addition of regrind can produce significant reductions in rate or even unacceptable extrusion characteristics. In cases where neat resin feed rates produce borderline extrusion or limit rates, the addition of regrind is usually impossible.

The process of the present invention separates the screw feeding and melting processes from the metering process. The system consists of an extruder with melter feed screw, melt pump, and associated adapters and control systems. By separating the solids conveying (feeding) function from the metering process, one can optimize screw utilization to better meet the feeding characteristics of materials with inherent feed limitations, and also compensate for problems associated with the addition of film regrind. This system can eliminate the problems of screw surging, high melt temperatures, and polymer degradation, and thereby result in superior product quality.

TABLE IIA

EXPERIMENT DATA
BULK DENSITIES AND FEED RATES OF
RESIN/REGRIND BLENDS

|  |  | GRSN-7047[1] | GRSN-7047 +5% GRSN-7042[2] |  | GRSN-7047* +10% GRSN-7042 |  |
|---|---|---|---|---|---|---|
|  |  | Virgin | Regrind | % Reduction | Regrind | % Reduction |
| Resin |  | lbs/ft$^3$ | lbs/ft$^3$ |  | lbs/ft$^3$ |  |
| Bulk Density |  | 24.8 | 21.6 | 13 | 19.8 | 20 |
| Hopper | Screw | lbs/hr/rpm | lbs/hr/rpm |  | lbs/hr/rpm |  |
| #1 | #1 | 3.2 | 3.1 | 3.1 | 2.9 | 9.4 |
| #1 | #1 | 3.2 | 3.1 | 3.1 | 2.8 | 12.5 |
| #2 | #2 | 3.8 | 3.2 | 15.8 | 2.7 | 28.9 |
| #2 | #3 | 3.6 | 3.2 | 11.1 | 2.8 | 22.2 |

Materials:
[1]GRSN - 7-47; M.I. - 1.0; bulk density - 24.8 lbs/ft$^3$
[2]GRSN - 7042 Regrind film; M.I. - 2.0; bulk density - 3.5 lbs/ft$^3$

TABLE IIB

SOLIDS CONVEYING APPARATUS - DESIGN

| HOPPER |  |
|---|---|
| #1 | 1 L/D |
| #2 | 1½ L/D Axial |
| SCREW |  |
| #1 Advanced Lead | 1.35 × Diameter |
| #2 Advanced Lead | 1.375 × Diameter |
| #3 Square Lead | 1.00 × Diameter |

Table III outlines experimental data which has been obtained using a 2½" NRM extruder with and without a melt pump. When operating without the melt pump, extrusion surging occurred and the melt temperature became quite high. When the melt pump was added to the line, output rate from the melt pump was quite uniform and the melt temperature dropped significantly.

TABLE III

EXPERIMENTAL DATA
Extrusion of Various Low Bulk
Density Granular Resin Mixture

|  | Without Melt Pump | With Melt Pump |
|---|---|---|
| Extrusion Rate (Lbs/hr) | 98.4 | 97.5 |
| RPM | 100 | 100 |
| Melt Temperature (°F.) | 410* | 363 |
| Head Pressure (psi) | 2500 | 100/3750 |
| Barrel Zone #1 (°F.) | 240 | 259 |
| Zone #2 (°F.) | 266 | 238 |
| Zone #3 (°F.) | 280 | 274 |
| Adapter #1 (°F.) | 288 | 274 |
| Melt Pump (°F.) | — | 335 |
| Adapter #2 (°F.) | — | 266 |

*Melt Temperature too high to fabricate film
2½" NRM extruder - 16:1 L/D

| With melter screw | Feed | 4.5 D |
|---|---|---|
|  | Transition | 4.0 D |
|  | Metering | 5.0 D |
|  | Mixing | 2.4 D |
|  | Lead 1.4 × D = 3.5 inches |  |

Air cooled barrel
Material - GRSN-7042 granular LLDPE having MI 2.0;
bulk density - 24.8

What is claimed is:

1. A process for the plasticization and pumping of low bulk density thermoplastic materials through extrusion die means employing a rotary mixer type extruder, having feeding, transition and metering sections and a melt pump, said feeding section having relatively deeper screw root depth and/or greater screw pitch and/or greater screw length than normally employed, thereby increasing the volumetric throughput rate through the feed section to compensate for said lower bulk density of material being processed and provide a substantially material-filled metering section, wherein the extrudate from said extruder is subsequently passed through an upstream flow channel member to the inlet of a rotary melt pump, which serves to control the material thoughput rate of the process and the molten material is discharged therefrom, through a downstream flow channel member, to and through a die member.

2. The process in accordance with claim 1, wherein said material exiting said metering section is next passed through a mixing section having a plurality of flutes formed by alternate groove and land means arranged to extend substantially longitudinally in the surface thereof and capable of substantially complete melting and mixing of the material before discharge from the extruder.

3. A process for the plasticization and pumping of low bulk density thermoplastic materials through extrusion die means employing a rotary mixer type extruder having feeding, transition and metering sections and a melt pump, said feeding section having relatively deeper screw root depth and/or greater screw pitch and/or greater screw length than normally employed, thereby increasing the volumetric throughput rate through the feeding section to compensate for said lower bulk density of material being processed and provide a substantially material-filled metering section not alone capable of controlling the material throughput rate of the process, wherein the extrudate from said extruder is subsequently passed through an upstream flow channel member to the inlet of a rotary melt pump which serves to control the material thoughput rate of the process and the molten material is discharged therefrom, through a downstream flow channel member, to and through a die member.

4. The process in accordance with claim 3, wherein said material exiting said metering section is next passed through a mixing section having a plurality of flutes formed by alternate groove and land means arranged to extend substantially longitudinally in the surface thereof and capable of substantially complete melting and mixing of the material before discharge from the extruder.

5. A process for the plasticization and pumping of low bulk density synthetic thermoplastic materials through extrusion die means employing a rotary mixer type extruder having feeding, transition and metering section and a melt pump, said feeding section having at least one of: up to 40 percent deeper screw root depth, up to 40 percent greater screw pitch and up to 75 percent greater screw length than normally employed, thereby increasing the volumetric throughput rate through the feeding section to compensate for said lower bulk density of material being processed and provide a substantially material-filled metering section not alone capable of controlling the material throughput rate of the process; and wherein the extrudate from said extruder is subsequently passed though an upstream flow channel to the inlet of a rotary melt pump which serves to control the material thoughput rate of the process and the molten material is discharged therefrom, through a downstream flow channel, to and through a die member.

6. The process in accordance with claim 5, wherein said material exiting said metering section is next passed through a mixing section having a plurality of flutes formed by alternate groove and land means arranged to extend substantially longitudinally in the surface thereof and capable of substantially complete melting and mixing of the material before discharge from the extruder.

* * * * *